United States Patent
Ma et al.

(10) Patent No.: US 9,851,517 B1
(45) Date of Patent: Dec. 26, 2017

(54) MICRO OPTICAL ENGINE ASSEMBLY

(71) Applicant: SAE Magnetics (H.K.) Ltd., Hong Kong (HK)

(72) Inventors: Vivian Wei Ma, Hong Kong (HK); Vincent Wai Hung, Hong Kong (HK); Margarito P. Banal, Jr., Hong Kong (HK); Gad Joseph Hubahib Gaviola, Hong Kong (HK)

(73) Assignee: SAE Magnetics (H.K.) Ltd., Hong Kong (HK)

( * ) Notice: Subject to any disclaimer, the term of this patent is extended or adjusted under 35 U.S.C. 154(b) by 0 days.

(21) Appl. No.: 15/439,939

(22) Filed: Feb. 22, 2017

(51) Int. Cl.
G02B 6/42 (2006.01)

(52) U.S. Cl.
CPC .......... *G02B 6/4244* (2013.01); *G02B 6/425* (2013.01); *G02B 6/4206* (2013.01); *G02B 6/428* (2013.01); *G02B 6/4239* (2013.01)

(58) Field of Classification Search
CPC .. G02B 6/4244; G02B 6/4206; G02B 6/4239; G02B 6/425; G02B 6/428; G02B 6/42
See application file for complete search history.

(56) References Cited

U.S. PATENT DOCUMENTS

| | | | | |
|---|---|---|---|---|
| 6,517,253 B1* | 2/2003 | Graesser | ............... | G02B 6/389 385/136 |
| 8,297,856 B2* | 10/2012 | Banal, Jr. | ............. | G02B 6/4244 385/135 |
| 2005/0117854 A1* | 6/2005 | Chiu | .................... | G02B 6/3825 385/92 |
| 2008/0024039 A1* | 1/2008 | Yao | ...................... | G11B 5/5552 310/328 |
| 2008/0044141 A1* | 2/2008 | Willis | .................. | G02B 6/3887 385/88 |
| 2011/0135258 A1* | 6/2011 | Sone | .................... | G02B 6/4201 385/94 |

* cited by examiner

*Primary Examiner* — Ryan Lepisto
*Assistant Examiner* — Erin Chiem (57) ABSTRACT

A micro optical engine assembly including a printed circuit board, a frame mounted on the printed circuit board, a micro optical engine mounted on the printed circuit board within a central space of the frame, a jumper having a lens-carrying end placed on top of the micro optical engine and aligned therewith by alignment members to thereby limit horizontal movement of the jumper, and a latch having a snap mechanism releasably snapped onto the frame, and at least one spring plate resiliently pressing against an upper surface of the jumper when the latch is snapped onto the frame to thereby limit vertical movement of the jumper.

16 Claims, 6 Drawing Sheets

MICRO OPTICAL ENGINE ASSEMBLY

FIELD OF THE TECHNOLOGY

The present application relates to an opto-electronic connector in optical communication, and specifically to an optic transceiver device.

BACKGROUND

Significant growth in optical communication demands more bandwidth and more capacity for data transmission, especially in data centers and consumer device market. To address this anticipated growth and to facilitate market's adoption of optical transceivers, a new generation for innovative photonic package design should appear in the optical communication area to meet the requirement on large capacity and high density.

Micro optical engine (MOE) based on batch fabrication by MEMS technology is an outstanding solution in the new generation. It is a miniature but independent optical engine, including VCSEL or PD and its IC driver respectively which can transfer electrical signal to optical signal as a transmitter or optical signal to electrical signal as a receiver by connecting the optical fiber through a jumper.

MOE can be assembled on printed circuit board (PCB) directly by normal surface mount technology (SMT). The miniature size allows it to have a high density arrangement and more flexible configuration on PCB, hence increases data transfer capacity and reduces assembly complexity. The challenge is to integrate the MOE to the jumper with fiber in order to couple the optical signal for signal transfer with lower power coupling loss. The mechanical integrity between MOE and jumper is the guarantee to achieve optical path integrity.

Thus, there is a need to provide a system in which the jumper is fixed as tightly as possible so as to maintain the optical power coupling in the system.

SUMMARY

According to one aspect, there is provided a micro optical engine assembly which may include:
  a printed circuit board;
  a metal frame mounted on the printed circuit board, the frame having a central space;
  a micro optical engine mounted on the printed circuit board within the central space of the frame;
  a jumper having a lens-carrying end placed on top of the micro optical engine and aligned therewith by alignment members, thereby limiting horizontal movement of the jumper; and the jumper having a fiber-coupling end at which an end of an optical fiber is coupled; and
  a metal latch having a pair of spring arms formed on two opposite sides thereof the latch for snapping into a pair of slots formed on two opposite sides of the frame, and a pair of spring plates resiliently pressing against an upper surface of the jumper when the latch is snapped onto the frame, thereby limiting vertical movement of the jumper;
  wherein the frame is a four-sided frame having two opposite vertical sidewalls, each sidewall having an inner planar portion and an outer planar portion extending from and bent 180 degrees over the inner planar portion to form a double-layer structure with a folded region defining a semi-cylindrical upper edge that matches a curved side portion of the latch when the latch is snapped onto the frame; and
  wherein the frame is formed with a first platform at a first end thereof which supports the fiber-coupling end of the jumper when the jumper is placed on top of the micro optical engine, and a second platform formed at a second end thereof opposite to the first end.

In one embodiment, an opening may be formed on the latch above an upper portion of the jumper through which adhesive is applied between the latch and the jumper.

In one embodiment, a fiber guard may be integrally formed along an end of the latch, and positioned on top of the optical fiber when the jumper is placed on top of the micro optical engine and the latch is snapped onto the frame to thereby protect and guard the optical fiber.

In one embodiment, the frame may be formed with four L-shaped legs at four corners thereof, and the four L-shaped legs act as four surface mount pads to facilitate surface mounting of the frame on the printed circuit board by solder paste.

According to another aspect, there is provided a micro optical engine assembly which may include:
  a printed circuit board;
  a plurality of fixture components mounted on the printed circuit board and enclosing a central space;
  a micro optical engine mounted on the printed circuit board within the central space;
  a jumper having a lens-carrying end placed on top of the micro optical engine and aligned therewith by alignment members, thereby limiting horizontal movement of the jumper; and the jumper having a fiber-coupling end to which an end of an optical fiber is coupled; and
  a latch having a snap mechanism releasably snapped onto the fixture components, and at least one spring plate resiliently pressing against an upper surface of the jumper when the latch is snapped onto the fixture components, thereby limiting vertical movement of the jumper.

In one embodiment, the snap mechanism may include a pair of spring arms formed on two opposite sides of the latch, and a pair of slots formed on two of the fixture components located at two opposite sides of the micro optical engine, the two spring arms being capable of snapping into the two slots respectively.

In one embodiment, each spring arm may include a flange section extending downwardly from the latch, and a bent section extending downwardly from the flange section and bending inwardly.

In one embodiment, the snapping force of the snap mechanism can be greater than compression force of the spring plate.

In one embodiment, an opening may be formed on the latch above an upper portion of the jumper through which adhesive is applied between the latch and the jumper.

In one embodiment, the fixture components may include a block located at a first end of the micro optical engine, and the fiber-coupling end of the jumper is supported on an upper surface of the block when the jumper is placed on top of the micro optical engine.

In one embodiment, the fixture components may include a plurality of planar bottom surfaces, which act as a plurality of surface mount pads to facilitate surface mounting of the fixture components on the printed circuit board by solder paste.

In one embodiment, a fiber guard may be integrally formed as a bent portion along an end of the latch, and positioned on top of the optical fiber when the jumper is placed on top of the micro optical engine and the latch is snapped onto the fixture components to thereby protect and guard the optical fiber.

In one embodiment, the fixture components may be integrated as a frame, and the frame is a four-sided frame defining the central space within which the micro optical engine is positioned.

In one embodiment, the frame may have two opposite vertical sidewalls, each sidewall comprising an inner planar portion and an outer planar portion extending from and bent 180 degrees over the inner planar portion to form a double-layer structure with a folded region defining a semi-cylindrical upper edge that matches a curved side portion of the latch when the latch is snapped onto the frame.

In one embodiment, the frame may be formed with a first platform at a first end thereof, and the fiber-coupling end of the jumper is supported on an upper surface of the first platform when the jumper is placed on top of the micro optical engine.

In one embodiment, the frame may be formed with a second platform at a second end thereof opposite to the first end, and the second platform acts as a support link for linking up the frame.

In one embodiment, an outer edge of the first platform may be formed with a pair of upwardly extending tabs at two opposite sides thereof for reinforcing the frame and guiding the position of the jumper on the frame during assembly process.

In one embodiment, the frame may be formed with four L-shaped legs at four corners thereof, and the four L-shaped legs, defining four planar bottom surfaces which act as four surface mount pads to facilitate surface mounting of the frame on the printed circuit board by solder paste.

Although the micro optical engine assembly is shown and described with respect to certain embodiments, it is obvious that equivalents and modifications will occur to others skilled in the art upon the reading and understanding of the specification. The micro optical engine assembly in the present application includes all such equivalents and modifications, and is limited only by the scope of the claims.

BRIEF DESCRIPTION OF THE DRAWINGS

Specific embodiments of the micro optical engine assembly will now be described by way of example with reference to the accompanying drawings wherein.

DETAILED DESCRIPTION

Reference will now be made in detail to a preferred embodiment of the micro optical engine assembly, examples of which are also provided in the following description. Exemplary embodiments of the micro optical engine assembly are described in detail, although it will be apparent to those skilled in the relevant art that some features that are not particularly important to an understanding of the micro optical engine assembly may not be shown for the sake of clarity.

Furthermore, it should be understood that the micro optical engine assembly is not limited to the precise embodiments described below and that various changes and modifications thereof may be effected by one skilled in the art without departing from the scope of the protection. For example, elements and/or features of different illustrative embodiments may be combined with each other and/or substituted for each other within the scope of this disclosure and appended claims.

For illustration purposes, the terms such as "upper", "lower", "vertical", "horizontal", "top", or "bottom" appeared hereinafter relate to the invention as it is oriented in the drawings. It is understood that the invention may assume various positions, except where expressly specified to the contrary. Furthermore, it is understood that the specific devices shown in the drawings, and described in the following description, are simply exemplary embodiments of the invention. Hence, specific dimensions and other physical characteristics related to the embodiments disclosed hereinafter are not to be considered as limiting.

It should be noted that throughout the specification and claims herein, when one element is said to be "coupled" or "connected" to another, this does not necessarily mean that one element is fastened, secured, or otherwise attached to another element. Instead, the term "coupled" or "connected" means that one element is either connected directly or indirectly to another element or is in mechanical or electrical communication with another element.

Figure 1:
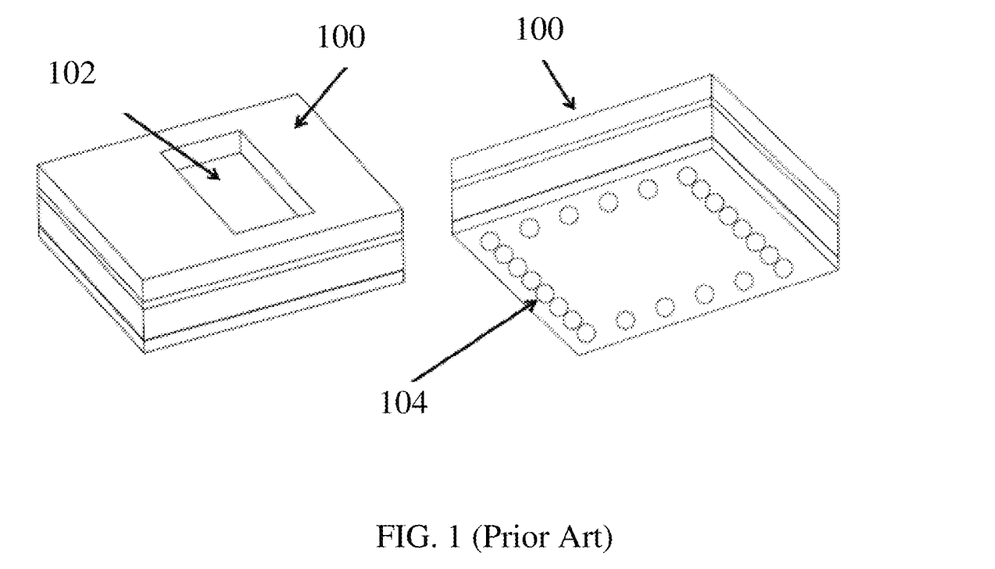
FIG. 1 shows a top perspective view and a bottom perspective view of a micro optical engine of the prior art.

FIG. 1 shows a top perspective view and a bottom perspective view of a micro optical engine (MOE) 100 of the prior art. The MOE 100 is a batch fabricated miniature device, having optical window/alignment feature 102 on the top surface and solder balls 104 on the bottom surface for electrical connection.

Figure 2A:
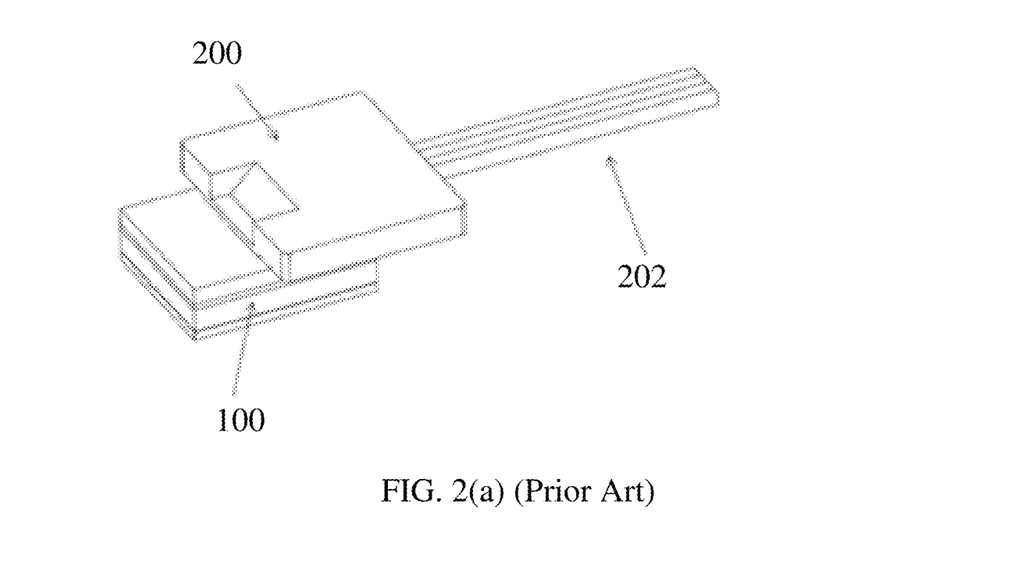
FIG. 2(a) is a top perspective view of an optical transceiver module of the prior art.
Figure 2B:
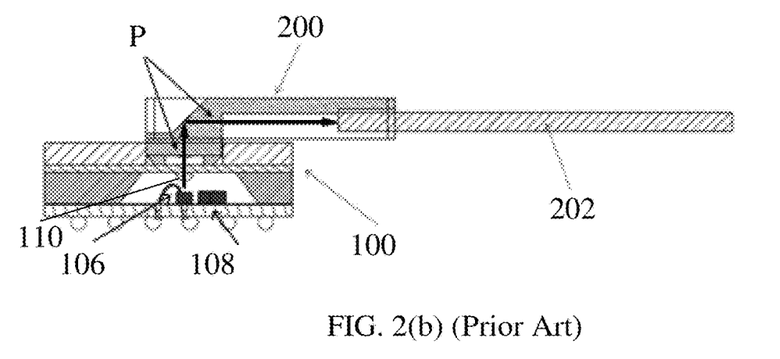
FIG. 2(b) is a cross sectional view of the optical transceiver module of the prior art shown in FIG. 2(a)

FIG. 2(a) is a top perspective view of an optical transceiver module of the prior art; and FIG. 2(b) is a cross sectional view of the optical transceiver module shown in FIG. 2(a). The optical transceiver module includes a MOE 100 and an optical jumper 200. The optical transceiver module is a compact and integrated system for transferring electrical signal to optical signal and vice versa. It has a complete set of functional components, such as an emitting light source or a photo detector 106, a corresponding driving integrated circuit 108 and an optical lens 110 to realize electrical to optical, or optical to electrical signal transfer. The jumper 200 is mounted on top of the MOE 100 to collect signal from the optical source by the optical lens 110 and guide it into optical fiber 202, and a receiver module on the other end has the engine with a photo detector inside to receive the optical signal from the lens jumper. FIG. 2(b) also shows the optical path P in the transceiver module.

Figure 3A:
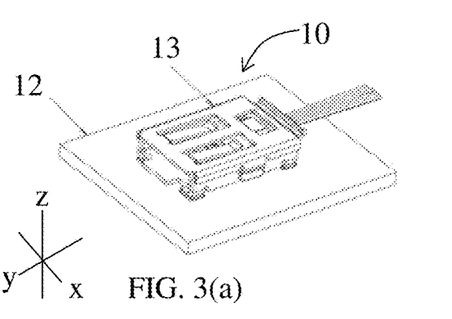
FIG. 3(a) is a top perspective view of a micro optical engine assembly according to an embodiment of the present application.
Figure 3B:
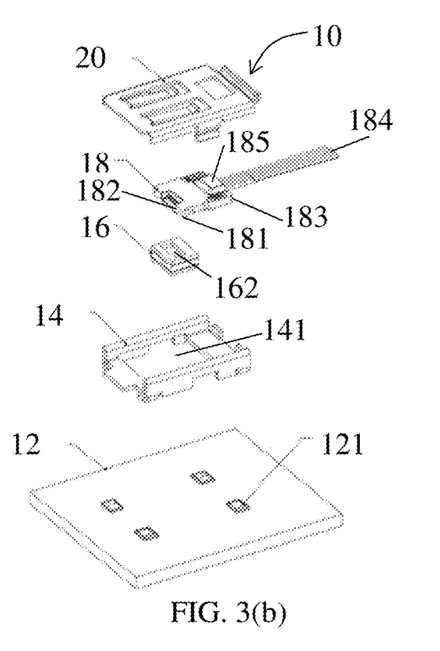
FIG. 3(b) is an exploded view of the micro optical engine assembly according to an embodiment of the present application.

FIG. 3(a) is a top perspective view of a micro optical engine assembly 10 according to an embodiment of the present application, and FIG. 3(b) is an exploded view of the micro optical engine assembly 10 according to the embodiment shown in FIG. 3(a).

The micro optical engine assembly 10 may include a printed circuit board 12 and a transceiver module assembly 13. The transceiver module assembly 13 may include a plurality of fixture components mounted on the printed circuit board 12 and enclosing a central space 141; and a micro optical engine 16 mounted on the printed circuit board 12 within the central space 141. The plurality of fixture components may be integrated as a frame 14. The transceiver module assembly 13 may further include a jumper 18 having a lens-carrying end 181 placed on top of the micro optical engine 16 and aligned therewith by alignment members 162, 182, and an opposite fiber-coupling end 183 at which an end of an optical fiber 184 is coupled. Finally, a latch 20 can be releasably snapped onto the frame 14. Details of the frame 14, micro optical engine 16, jumper 18 and latch 20 will be described below.

Figure 4A:
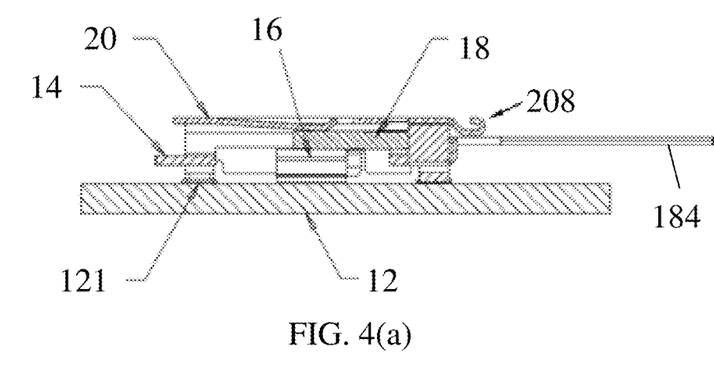
FIG. 4(a) is a longitudinal cross sectional view of the micro optical engine assembly according to an embodiment of the present application.
Figure 4B:
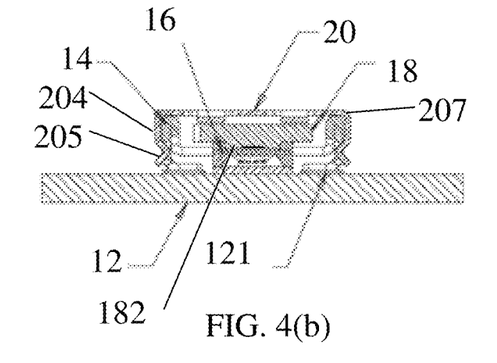
FIG. 4(b) is a transverse cross sectional view of the micro optical engine assembly according to an embodiment of the present application.

FIG. 4(a) shows a longitudinal cross sectional view of the micro optical engine assembly according to an embodiment of the present application, and FIG. 4(b) shows a transverse cross sectional view of the micro optical engine assembly according to an embodiment of the present application.

The jumper 18 needs to be easily assembled on the micro optical engine 16 and needs to have a structure with good stability. Hence, alignment members are required to be provided on the jumper 18 and the micro optical engine 16. According to the illustrated embodiment, alignment members 162, 182 may include an alignment recess 162 (optical window) formed on an upper surface of the micro optical engine 16, and an alignment protrusion 182 provided on a lower surface of the jumper 18 at the lens-carrying end 181 thereof. The lens-carrying end 181 of the jumper 18 may be placed on top of the micro optical engine 16 and aligned therewith by the alignment members 162, 182, thereby limiting horizontal movement of the jumper 18 in X-Y directions on a plane parallel to the printed circuit board 12

In the illustrative embodiment, the alignment recess 162 and the alignment protrusion 182 are rectangular in shape. The alignment protrusion 182 can be snugly fitted inside the alignment recess 162 when the jumper 18 is passively aligned on top of the micro optical engine 16. Precise alignment of the jumper 18 with the micro optical engine 16 can achieve optical system integrity. The jumper 18 and the micro optical engine 16 can be firmly held together and well protected by the frame 14 and the latch 20. There is sufficient contact force between the jumper 18 and the micro optical engine 16 to achieve the desired performance. The coupling and alignment of the jumper 18 with the micro optical engine 16 can protect the functional surfaces of the lenses from any unintentional contact and damage.

Figure 5A:
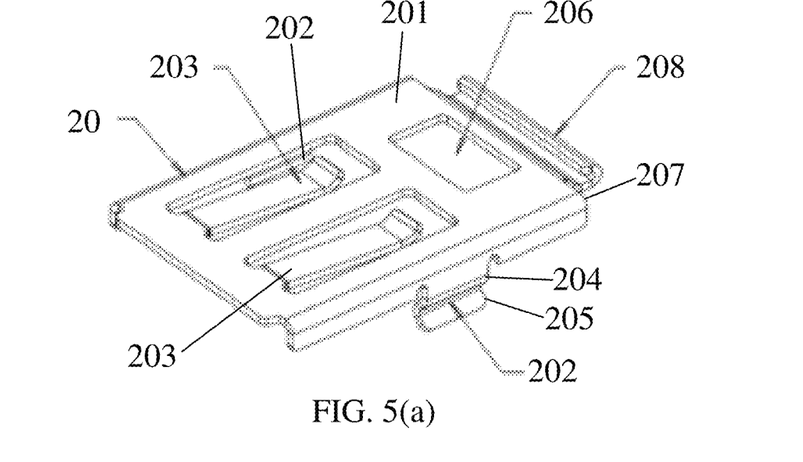
FIG. 5(a) is a top perspective view of a latch of the micro optical engine assembly according to an embodiment of the present application.

FIG. 5(a) is a top perspective view of the latch 20 of the micro optical engine assembly 10 according to an embodiment of the present application.

The latch 20 can serve as a frame cover for substantially covering the frame 14. The latch 20 can be releasably snapped onto the frame 14 by a snap mechanism 202, 142. In the illustrated embodiment, the snap mechanism can be in the form of a pair of spring arms 202 formed on two opposite sides of the latch body 201, and a pair of slots 142 formed on two opposite sides of the frame 14. Preferably, the pair of spring arms 202 can be formed on two opposite sides of the latch body 201 at a middle portion thereof, and the pair of slots 142 can be formed on two opposite sides of the frame 14 at a middle portion thereof. The two spring arms 202 may be configured to snap into the two slots 142 respectively when the latch 20 is snapped onto the frame 14.

Each spring arm 202 may include a flange section 204 extending downwardly from one side of the latch body 201, and a bent section 205 extending downwardly from the flange section 204 and bending inwardly into the slot 142 when the latch 20 is snapped onto the frame 14, as illustrated in FIGS. 3(a) and 4(b).

Although it has been shown and described that the snap mechanism 202, 142 is in the form of a pair of spring arms 202 formed on two opposite sides of the latch body 201, and a pair of slots 142 formed on two opposite sides of the frame 14, it is understood by one skilled in the art that any other possible snap mechanism may be employed.

The latch 20 includes a latch body 201 which may be formed with two spring plates 203 resiliently pressing against an upper surface of the jumper 18 when the latch 20 is snapped onto the frame 14, thereby limiting vertical movement of the jumper 18 in a Z direction perpendicular to the printed circuit board 12.

Although it has been shown and described that there are two spring plates 203 formed on the latch 20, it is understood by one skilled in the art that the latch 20 may be provided with only one resilient spring plate formed at the center of the latch body 201 for resiliently pressing against an upper surface of the jumper 18 when the latch 20 is snapped onto the frame 14.

An opening 206 may be formed on the latch 20 above an upper portion 185 (FIG. 3) of the jumper 18. This opening 206 can be used as an assembly check window and can allow additional adhesive to be applied between the latch 20 and the jumper 18 so as to firmly attach the latch 20 and the jumper 18 together in place. The opening 206 may be rectangular in shape or in any other suitable shape.

A fiber guard 208 may be integrally formed along an end of the latch 20. The fiber guard 208 can be in the form of a bent or rolled up portion formed along the end of the latch 20. The fiber guard 208 can be positioned on top of the optical fiber 184 when the jumper 18 is placed on top of the micro optical engine 16 and the latch 20 is snapped onto the frame 14. The fiber guard 208 can guard the optical fiber 184 and protect it from scratch and damage during assembling and handling. The fiber guard 208 can prevent the optical fiber 184 from sharp bending and can maintain the optical fiber 184 within a desired optical fiber path.

It is understood that the latch 20 can be easily disassembled to allow repair and maintenance of the assembly by releasing the snap mechanism 202, 142, and pulling the latch 20 from the frame 14. The micro optical engine assembly 10 of the present application is unique so that it can apply to optical transceiver modules with rigidly fit assembly and facilitate easy repair and maintenance.

Figure 5B:
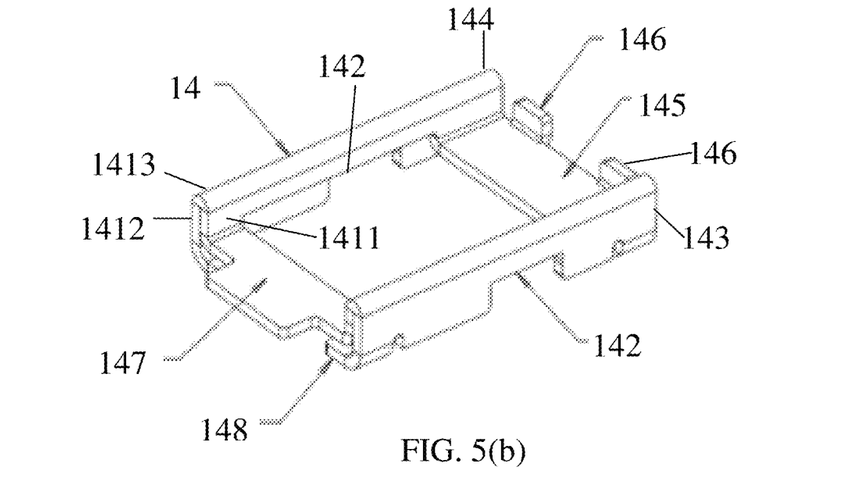
FIG. 5(b) is a top perspective view of a frame of the micro optical engine assembly according to an embodiment of the present application.

FIG. 5(b) is a top perspective view of the frame 14 of the micro optical engine assembly 10 according to an embodiment of the present application. In the present embodiment, the frame 14 can be a four-sided frame having central space 141 within which the micro optical engine 16 is positioned.

The frame 14 may have two opposite vertical sidewalls 143, 144. Each sidewall 143, 144 may have an inner planar portion 1411 and an outer planar portion 1412 extending from and bent 180 degrees over the inner planar portion 1411 to form a double-layer structure with a folded portion defining a semi-cylindrical upper edge 1413 that matches a curved side portion 207 of the latch 20 when the latch 20 is snapped onto the frame 14. With the inwardly bent section 205 on the resilient spring arm 202, the latch 20 can be easily snapped onto the frame 14, and can firmly grasp the frame 14 by a snapping force. This snapping force can be greater than the compression force of the spring plate 203 in order to keep the whole structure of the assembly stable.

The frame 14 may be formed with the first platform 145 at a first end thereof. The fiber-coupling end of the jumper 18 can be supported on an upper surface of the first platform 145 when the jumper 18 is placed on top of the micro optical engine 16.

An outer edge the first platform 145 may be formed with a pair of upwardly extending tabs 146 at two opposite sides thereof. The two tabs 146 can act as alignment stops for the jumper 18. The two tabs 146 can guide the positioning of the jumper 18 on the frame 14 during assembly process, and make it easy to assemble the jumper 18 on the frame 14. The two tabs 146 can also reinforce the structure of the frame 14.

The frame 14 may be formed with a second platform 147 at a second end thereof opposite the first end. The second platform 147 can serve as a support link for linking up the ends of the two sidewalls 143, 144, and can therefore form a 4-sided frame that can enhance the total mechanical strength of the frame 14. The second platform 147 may be T-shaped so as to save space and extend the surface area for pick up in the surface mount process without affecting the outline length of the frame 14. The first and second platforms 145, 147 are provided at two opposite ends of the frame 14 and can act as two pick-up platforms for picking up of the frame 14 by nozzle and placement of the frame 14 on the printed circuit board 12 during the assembly process.

The frame may be formed with four L-shaped legs 148 at four corners thereof. The four L-shaped legs 148 can act as four surface mount pads to facilitate surface mounting of the frame 14 on the printed circuit board 12 by solder paste 121.

Each of the frame 14 and latch 20 can be made from a metal sheet by conventional stamping and bending processes. It is understood that the frame 14 and the latch 20 may be made of any other suitable material.

Figure 6A:
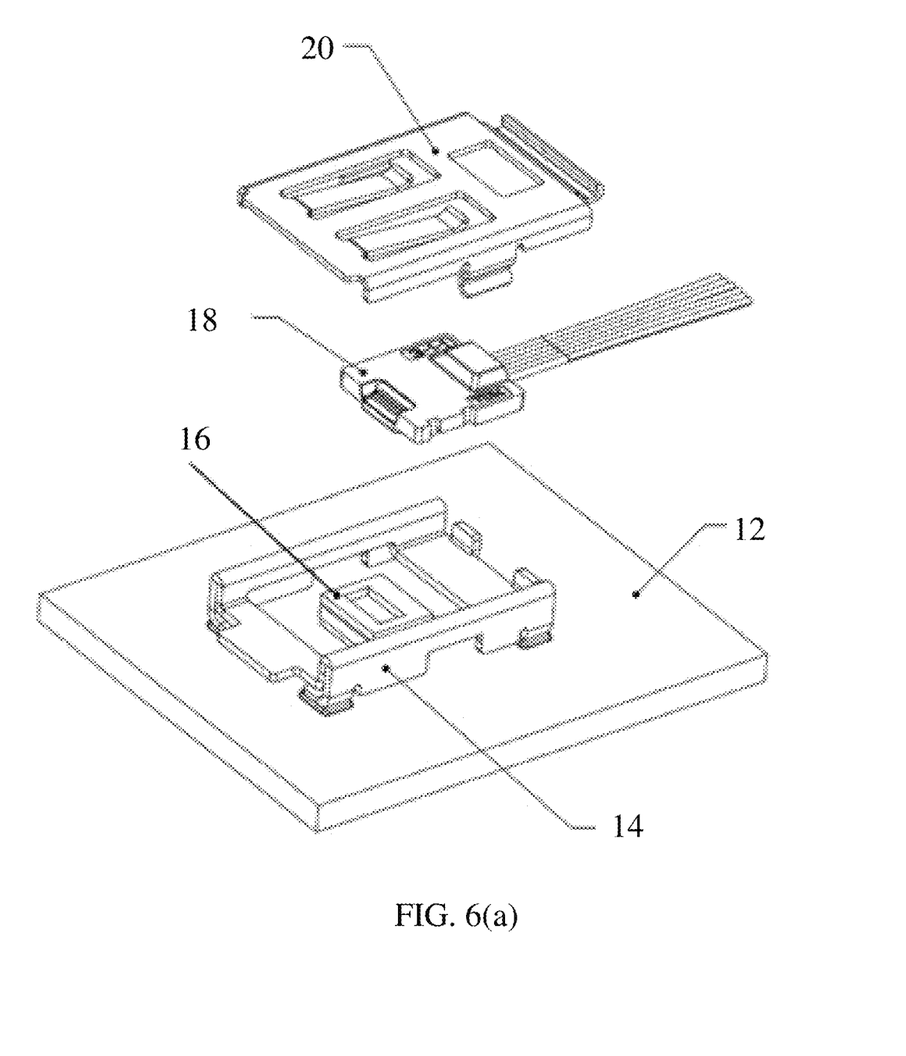
FIGS. 6(a) to 6(c) show the assembling steps of the micro optical engine assembly according to an embodiment of the present application.
Figure 6B:
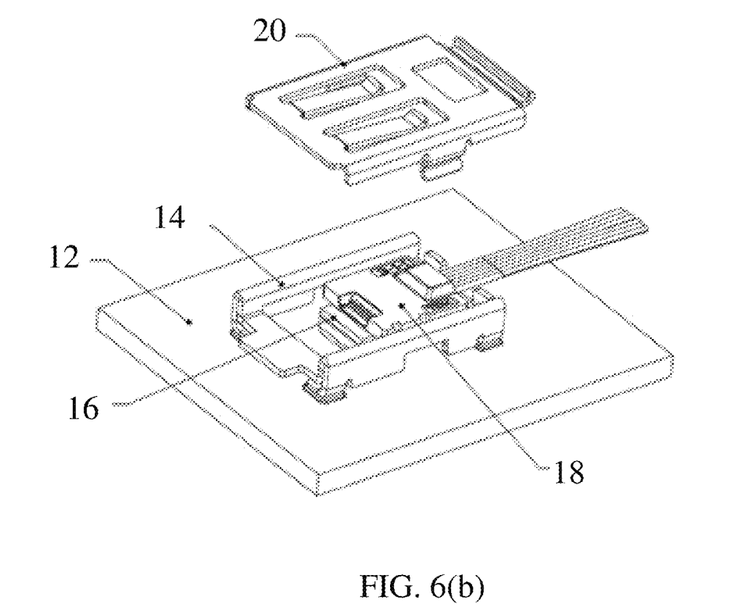
Figure 6C:
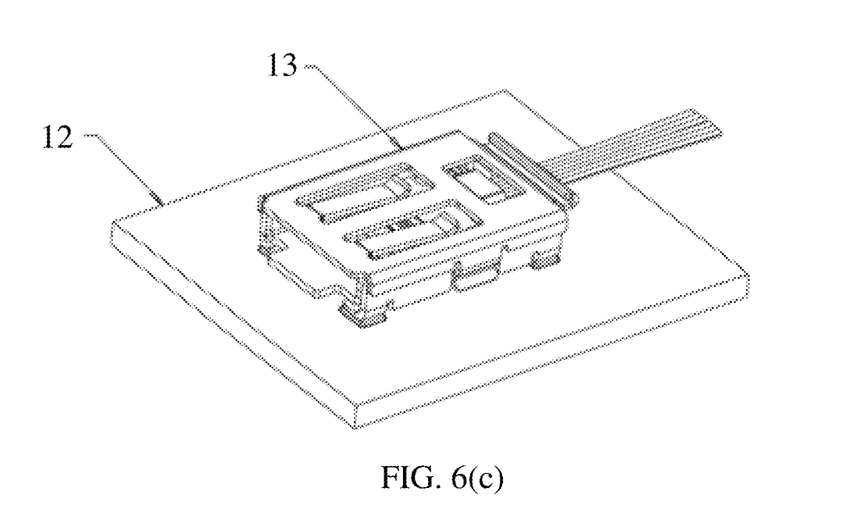

FIGS. 6(a) to 6(c) show the assembly process of the micro optical engine assembly according to an embodiment of the present application.

The micro optical engine 16 can be attached to the printed circuit board 12 by using normal surface mount process, which can achieve reliable electrical connection and mechanical support. The frame 14 can be positioned so as to enclose the micro optical engine 16 on the printed circuit board 12. The frame 14 can be fixed firmly on the printed circuit board 12 by solder paste 121 in the same surface mount process. After reflow, both of the micro optical engine 16 and frame 14 are assembled on the printed circuit board 12, as shown in FIG. 6(a).

The alignment protrusion 182 of the jumper 18 can then be inserted into the alignment recess 162 on the micro optical engine 16 and passively aligned therewith to form a precise optical path. Movement of the jumper 18 in the horizontal X, Y directions can therefore be restricted by the alignment features 182, 162, as illustrated in FIG. 6(b).

Instead of holes or other fixing components of the prior art, the latch 20 disclosed in the present application can be snapped onto the frame 14 by the snap mechanism 202, 142. The spring plates 203 can then press on the jumper 18 to hold and restrict movement of the jumper 18 in the vertical Z direction. The compression force of the spring plates 203 on the micro optical engine 16 can be calculated to overcome the tilting or bending force from the optical fiber 184 during assembly and usage. This is to make sure that the jumper 18 can press down the micro optical engine 16 in its position, and the spring force is strong enough to prevent the jumper 18 from detaching, tilting and lateral shifting. This spring force is less than the snap force of the snap mechanism 202, 142 in order to make the entire structure of the assembly stable. FIG. 6(c) shows the completed assembly.

The distributed fixture components have the same functional features as frame 14. For example, in this embodiment, two of the fixture components can be located at the two opposite sides of micro optical engine 16, the two opposite fixture components have slots 142 for latch 20 snapping, and another fixture components includes a block can be located at a first end of the micro optical engine 16. The block acts as the first platform 145 with the same tabs 146.

The fixture components may have planar bottom surfaces, which act as surface mount pads to facilitate surface mounting of the fixture components on the printed circuit board by solder paste.

While the micro optical engine assembly has been shown and described with particular references to a number of preferred embodiments thereof, it should be noted that various other changes or modifications may be made without departing from the scope of the appended claims.

What is claimed is:

1. A micro optical engine assembly comprising:
   (a) a printed circuit board;
   (b) a metal frame mounted on the printed circuit board, the frame having a central space;
   (c) a micro optical engine mounted on the printed circuit board within the central space of the frame;
   (d) a jumper having a lens-carrying end placed on top of the micro optical engine and aligned therewith by alignment members, thereby limiting horizontal movement of the jumper; and the jumper having a fiber-coupling end at which an end of an optical fiber is coupled; and
   (e) a metal latch comprising a pair of spring arms formed on two opposite sides thereof the latch for snapping into a pair of slots formed on two opposite sides of the frame, and a pair of spring plates resiliently pressing against an upper surface of the jumper when the latch is snapped onto the frame, thereby limiting vertical movement of the jumper;
   (f) wherein the frame is a four-sided frame having two opposite vertical sidewalls, each sidewall having an inner planar portion and an outer planar portion extending from and bent 180 degrees over the inner planar portion to form a double-layer structure with a folded region defining a semi-cylindrical upper edge that matches a curved side portion of the latch when the latch is snapped onto the frame; and
   (g) wherein the frame is formed with a first platform at a first end thereof which supports the fiber-coupling end of the jumper when the jumper is placed on top of the micro optical engine, and a second platform formed at a second end thereof opposite to the first end.

2. The micro optical engine assembly as claimed in claim 1, wherein an opening is formed on the latch above an upper portion of the jumper through which adhesive is applied between the latch and the jumper.

3. The micro optical engine assembly as claimed in claim 1, wherein a fiber guard is integrally formed along an end of the latch, and positioned on top of the optical fiber when the jumper is placed on top of the micro optical engine and the latch is snapped onto the frame to thereby protect and guard the optical fiber.

4. The micro optical engine assembly as claimed in claim 1, wherein the frame is formed with four L-shaped legs at four corners thereof, and the four L-shaped legs act as four surface mount pads to facilitate surface mounting of the frame on the printed circuit board by solder paste.

5. A micro optical engine assembly comprising:
(a) a printed circuit board;
(b) a plurality of fixture components mounted on the printed circuit board and enclosing a central space;
(c) a micro optical engine mounted on the printed circuit board within the central space; (d) a jumper having a lens-carrying end placed on top of the micro optical engine and aligned therewith by alignment members, thereby limiting horizontal movement of the jumper; and the jumper having a fiber-coupling end to which an end of an optical fiber is coupled; and
(d) a latch comprising a snap mechanism releasably snapped onto the fixture components, and at least one spring plate resiliently pressing against an upper surface of the jumper when the latch is snapped onto the fixture components, thereby limiting vertical movement of the jumper;
(e) wherein the fixture components are integrated as a frame, and the frame is four-sided frame defining the central space within which the micro optical engine is positioned; and
(f) wherein the frame has two opposite vertical sidewalls, each sidewall comprising an inner planar portion and an outer planar portion extending from and bent 180 degrees over the inner planar portion to form a double-layer structure with a folded region defining a semi-cylindrical upper edge that matches a curved side portion of the latch when the latch is snapped onto the frame.

6. The micro optical engine assembly as claimed in claim 5, wherein the snap mechanism comprises a pair of spring arms formed on two opposite sides of the latch, and a pair of slots formed on two of the fixture components located at two opposite sides of the micro optical engine, the two spring arms being capable of snapping into the two slots respectively.

7. The micro optical engine assembly as claimed in claim 6, wherein each spring arm comprises a flange section extending downwardly from the latch, and a bent section extending downwardly from the flange section and bending inwardly.

8. The micro optical engine assembly as claimed in claim 6, wherein snapping force of the snap mechanism is greater than compression force of the spring plate.

9. The micro optical engine assembly as claimed in claim 5, wherein an opening is formed on the latch above an upper portion of the jumper through which adhesive is applied between the latch and the jumper.

10. The micro optical engine assembly as claimed in claim 5, wherein the fixture components comprise a block located at a first end of the micro optical engine, and the fiber-coupling end of the jumper is supported on an upper surface of the block when the jumper is placed on top of the micro optical engine.

11. The micro optical engine assembly as claimed in claim 5, wherein the fixture components comprise a plurality of planar bottom surfaces, which act as a plurality of surface mount pads to facilitate surface mounting of the fixture components on the printed circuit board by solder paste.

12. The micro optical engine assembly as claimed in claim 5, wherein a fiber guard is integrally formed as a bent portion along an end of the latch, and positioned on top of the optical fiber when the jumper is placed on top of the micro optical engine and the latch is snapped onto the fixture components to thereby protect and guard the optical fiber.

13. The micro optical engine assembly as claimed in claim 5, wherein the frame is formed with a first platform at a first end thereof, and the fiber-coupling end of the jumper is supported on an upper surface of the first platform when the jumper is placed on top of the micro optical engine.

14. The micro optical engine assembly as claimed in claim 13, wherein the frame is formed with a second platform at a second end thereof opposite to the first end, and the second platform acts as a support link for linking up the frame.

15. The micro optical engine assembly as claimed in claim 13, wherein an outer edge of the first platform is formed with a pair of upwardly extending tabs at two opposite sides thereof for reinforcing the frame and guiding the position of the jumper on the frame during assembly process.

16. The micro optical engine assembly as claimed in claim 5, wherein the frame is formed with four L-shaped legs at four corners thereof, and the four L-shaped legs, defining four planar bottom surfaces which act as four surface mount pads to facilitate surface mounting of the frame on the printed circuit board by solder paste.

\* \* \* \* \*